United States Patent Office 3,462,315
Patented Aug. 19, 1969

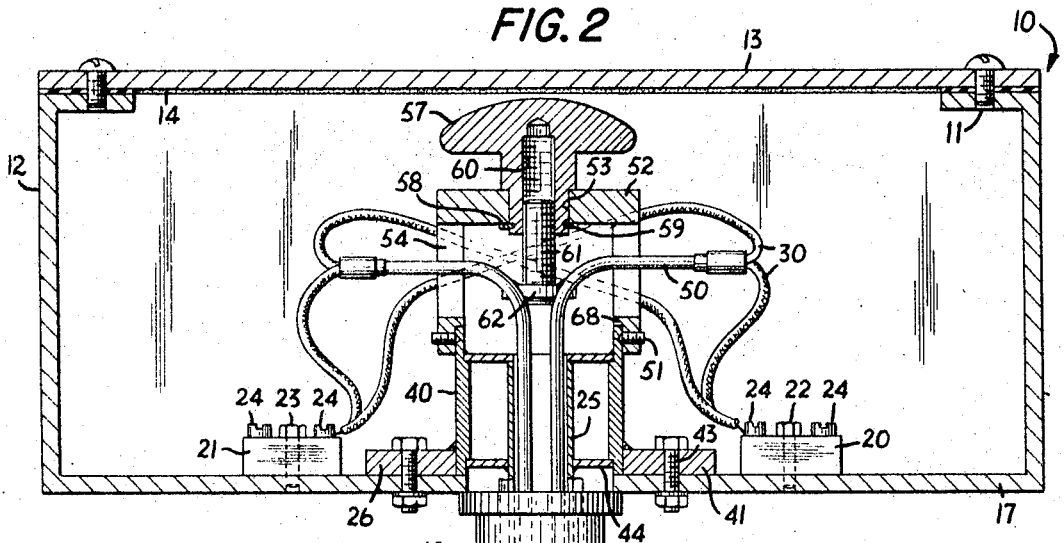
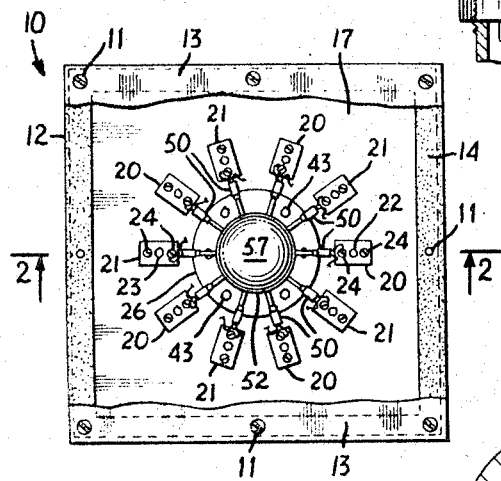
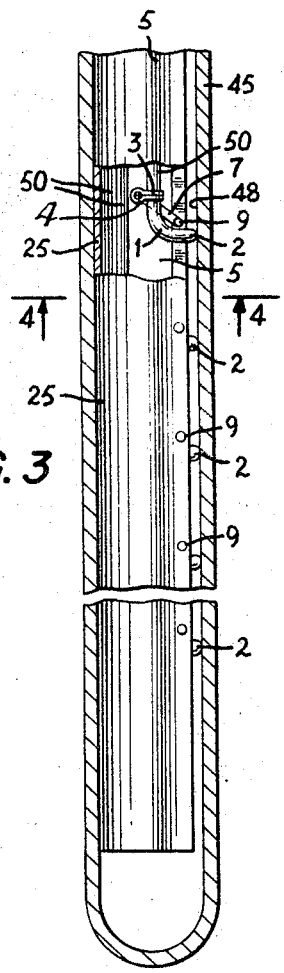
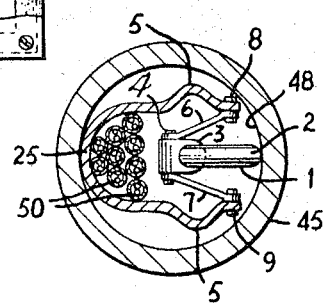

3,462,315
SWING MOUNTED THERMOCOUPLE ASSEMBLY
Marcel G. Verrando and Jay R. Kelchner, Cortland, N.Y., assignors to Pall Corporation, Glen Cove, N.Y., a corporation of New York
Filed Aug. 26, 1965, Ser. No. 482,716
Int. Cl. H01v 1/02
U.S. Cl. 136—230    11 Claims

ABSTRACT OF THE DISCLOSURE

A swinging link thermocouple assembly capable of being quickly into or out of contact with a surface whose temperature is to be measured is provided. The temperature sensing portion of the thermocouple assembly is mounted on a swinging link, one end of which is mounted on a guide member. The guide member is removably mounted in a thermowell in a fixed position relative to the surface whose temperature is to be measured. Means, such as a handle, are provided for moving the temperature sensing element relative to the guide member thereby swinging the temperature sensing portion either into or out of contact with the surface whose temperature is to be measured.

---

This invention relates to thermocouple assemblies, and, more particularly, to thermocouple assemblies that are quickly and easily brought into contact with a surface whose temperature is to be measured, as in a receptacle, and removed from contact therewith when the thermocouple assembly is to be removed.

Thermocouple design has not varied appreciably over the past thirty years. Such assemblies normally include as essential components a receptacle extending into the system whose temperature is to be measured and, fastened thereto, a housing sheltering the thermocoupling sensing element and associated electrical connections. The sensing element extends into the receptacle, and is fastened to the housing, while the housing itself is usually threadably or otherwise mounted on the receptacle.

To ensure rapid and accurate response to any change in temperature, the thermocouple sensing element is installed so that it will remain in continuous contact with the wall of tthe receptacle in which it is encased during any contraction and expansion due to varying temperatures. Another advantage secured through direct contact of the thermocouple element with the receptacle is positive electrical grounding of the device. Grounding of the sensing element becomes especially important when using modern high speed logging equipment. Stray electrical signals will readily cause erroneous readings from an ungrounded element.

In order to ensure close heat-conducting and electrical contact of the thermocouple sensing element with the wall of the receptacle, the element is normally biased against the wall by the use of springs or bimetallic strips at the thermocouple junctions. The use of such bias means has made the insertion and withdrawal of thermocouple sensing elements into and from a receptacle a difficult problem, particularly in the case of receptacles of great length, or which are not entirely straight, or which have restricted entrances. The problem is complicated when a plurality of thermocouple sensing elements are to be inserted in a single receptacle.

Moreover, although springs and like bias means initially may be adequate to maintain positive wall contacts upon prolonged use, springs lose their biasing ability in time, due to overheating and metal fatigue, and erode the thermocouple sensing elements.

Thermocouple assemblies frequenty must be placed in inaccessible or dangerous positions, since they must be placed exactly at the point where the temperature is measured. Moreover, when the system is subjected to extreme variations in temperatures, it may be necessary to insert in sequence a plurality of thermocouple sensing elements of more limited range to detect temperatures within the limits. This means that a thermocouple assembly frequently must be changed, when the temperature gives signs of exceeding the limited range of the thermocouple in use. Hence, it is important that the element be easily removable from the receptacle, when a substitution is required.

In accordance with the invention, thermocouple assemblies are provided in which the thermocouple sensing element can be brought into close heat- and electrically-conducting contact with a receptacle wall, or withdrawn from contact with the wall, as desired, by mechanical manipulation from a point outside the receptacle. The assemblies are so designed that such conducting contact is assured under all conditions. Inasmuch as the sensing element can be fully withdrawn from contact with the wall, such assemblies can be removed from or installed in standard receptacles without difficulty, and positive location of the sensing element at the desired position in the receptacle is rapidly achieved.

The thermocouple assemblies in accordance with the invention comprise, in combination, a temperature sensing element; mounting means therefor; a swinging link assembly for moving the sensing element into and away from contact with a receptacle wall, comprising at least one swinging link pivotally mounted at a first end to the sensing element and pivotally mounted at a second end to the mounting means; and means for imparting reciprocating movement to the sensing element relative to the mounting means, whereby the element is swung on the link in an arc about the second pivotal mounting for movement into or away from engagement with a surface whose temperature is to be measured.

Various means can be provided for imparting reciprocating movement to the sensing means. A shaft and union assembly can be provided with the sensing element attached to the shaft and the union fixed to the thermocouple receptacle or housing in a manner such that rotation of the shaft on or in the union will reciprocate the sensing element into or out from the receptacle. The mounting means is fixed in the receptacle, and accordingly, such reciprocating movement swings the sensing element on the link in an arc about the pivot thereof attached to the mounting means. Other types of reciprocating means that can be employed will be readily apparent, such as a bayonet-type joint, or a cam and cam follower combination, or a pin-and-slit combination, all arranged between a shaft and an enclosing tube, or a pair of concentric tubes. Obviously, any means capable of converting rotational motion into reciprocating motion can be employed.

The reciprocating means can be provided with a limiting stop means, for holding the reciprocating member in position at one end of the reciprocation travel path, with the sensing element in contact with the receptacle wall, and a second limiting stop can be provided to retain the sensing element in the retracted position, at the other end of the limit of reciprocation of the reciprocating means. This will prevent accidental retraction of the elements in use, as well as vibration and movement, with resultant damage and inaccurate readings.

The swinging link on which the sensing element is swung about the mounting means pivot can be of any shape or configuration, straight, or L-shaped, according to the type of swinging movement desired, but it will normally be elongated, and straight, in the form of an arm, rod or bar, to which the sensing element is pivotally attached at one end, with the other end pivotally mounted on the support. In a preferred embodiment, a pair of pivoting links are employed, one on each side of the sensing element, so that the sensing element is slung between them.

The length of the swinging link is determined by the radius required for the arc, which must of course be of a length sufficient to retract the sensing element fully from the receptacle wall, and sufficiently distant therefrom to enable it to clear the wall in its travel into or out from the receptacle, when the element is to be changed. The sensing element will normally be swung through an arc of from 90 to 180° about the mounting means pivot, between the limits of its swing. The length of the radius will, of course, also be limited by the available diameter of the receptacle, and the number of thermocouple elements inserted therein.

The support means which includes mounting means and guide means for the sensing element or elements. The guide means will normally extend the length of the receptacle, and all of the sensing elements to be inserted in the receptacle are preferably attached to a single guide means, to conserve space. The mounting means is rigidly held or fixed relative to the receptacle after insertion. It can, for example, be attached to the receptacle, or the housing, or to the means for reciprocating the sensing element.

The guide means or support can take any form, but is preferably an L- or U- or V-shaped channel, with one or both sides of the channel L, U or V serving as the mounting support for the pivot to which the swinging links are attached. The channel can neatly fit just within the inside walls of the receptacle, to provide a maximum of available space within the L, U or V, for reception of the sensing elements to be fitted therein. When a plurality of sensing elements are fitted in a single channel, the elements are spaced along the channel according to the position desired in the receptacle, and are all connected, to be manipulated reciprocatingly at the same time.

It is customary in many thermocouple assemblies to enclose the thermocouple wires in rigid metallic conduits or sheaths. Such conduits are capable of retaining their shape when subjected to stress. Since the thermocouple elements can be swung into and out of contact with the receptacle wall with very little force, due to the pivoted suspension, such conduits or sheaths are well adapted to accept the forces necessary to effect such movement, and can be attached to the swinging links for this purpose, at a point adjacent the junction ends of the elements, and attached at the point where they emerge from the receptacle to the means for reciprocating the elements. Other supporting means will be apparent, however, and can be employed, depending upon the particular construction of the thermocouple elements.

It is customary to mount thermocouple assemblies in a manner to prevent vibration or rotation, so as to prevent damage to the electrical connections, or the development of a short circuit. If the sensing element is allowed to move excessively in the assembly during use, accuracy of the temperature element may be greatly reduced. Accordingly, the thermocouple assemblies of the invention are adapted in the usual way to be attached to the housing via a mounting block, a flange, by bolts or nuts or other permanent fasteners. The housing is adapted for mounting on or in any type of receptacle, such as a thermowell, pipe-type protective tube, or a blind receptacle, such as a bearing or mold block, and all of these will be understood to be encompassed by the term "receptacle" as used herein. The reciprocating means is also adapted to be held fast, as described previously.

While the swinging link means of the invention serves to hold the element junction against the surface whose temperature is to be measured, there can additionally be provided, if desired, a permanent magnet or electromagnet at the junction end of the sensing element, adapted to couple with the receptacle wall, to better ensure a heat- and electrically-conducting contact therewith in use. Such means does not affect withdrawal of the assemblies from the receptacle, where the sensing elements can be locked in the retracted position.

The thermocouple assembly of the invention is adapted for use with temperature sensing elements of conventional type. A preferred type of thermocouple element is a metal-sheathed cable containing thermocouple wires which are insulated by a hard-packed, inert metallic oxide. These are available under the trademark Trinox. Sheath materials include copper, aluminum, tantalum, steel, Inconel and stainless steel, and the thermocouple materials include copper-constantan, iron-constantan, chromel-alumel, platinum and platinum-rhodium as well as many other suitable materials. The standard installation material is magnesium oxide, but materials such as aluminum oxide, beryllium oxide or zirconium oxide also can be used. The thermocouple junction can be exposed, or closed and grounded in contact with the sheath, or closed and ungrounded with the thermocouple insulated from the sheath, as may be required.

The thermocouple sensing element is conveniently attached to a mounting block to support the element and the electrical connections therefor. The block may be made of metal, such as aluminum, steel, or stainless steel, or plastic such as polytetrafluoroethylene, polyoxymethylene, polcarbonate, and polychlorotrifluoroethylene resin.

The housing in which the temperature element is attached is also of generally conventional design, and is attached to the receptacle by any desired means. In most cases, the housing is threadably mounted on the receptacle, i.e., thermowell, by either internal or external threads, depending upon the dimensional requirements of the system. A bayonet-type joint can also be used, as well as a press-fit joint, staked or swaged joint or attachment with a locking device, i.e., a lock-nut. The housing can also be permanently mounted to the receptacle, inasmuch as the thermocouple assembly of the invention is readily removed from the housing, so that the housing once installed need never again be distrubed until the receptacle itself is replaced or moved. The housing can be of plastic, such as any of the materials mentioned above for the mounting block, or of metal, such as stainless steel.

The supplemental bias means is normally a coil or leaf spring. Because of the convenience of installation, a Belleville washer can also be used.

The drawings illustrate preferred embodiments of the invention:

FIGURE 1 is a top view into a housing incorporating a thermocouple assembly of the invention, the housing cover having been removed for a better view;

FIGURE 2 is a longitudinal section of the housing and a portion of the thermocouple assembly of FIGURE 1, taken along the line 2—2, and looking in the direction of the arrows, said housing having been rotated 90° for a better view.

FIGURE 3 is a longitudinal section of the lower portion of the thermocouple assembly of FIGURE 1; and FIGURE 4 is a cross-sectional view of the thermocouple assembly detail shown in FIGURE 3.

The thermocouple assembly of FIGURES 1 to 4 comprises a housing or box 10. The open top end of the housing 10 is supplied with a cover 13 which is attached to the housing by means of screws 11 as shown. A gasket 14 is snugly engaged between the cover at the top of the housing 12 in a leak-proof or weatherproof seal. Both the housing 10 and the cover 13 may be made of aluminum; the gasket is made of Viton A, rubber, or asbestos. Other suitable material can, of course, be used.

The lower portion of the housing terminates in an internally threaded tubular portion 15, the threads 16 of which are adapted to be threaded over an externally threaded receptacle, such as a thermowell. A horizontal shelf or ledge 17 is formed between the upper portion of the housing of greater diameter and the lower tubular portion, and at the periphery of this ledge are mounted a positive terminal block 20 and a negative terminal block 21, by means of screws 22 and 23. In these terminal blocks are thraded retainer posts 24, fitted with screw heads, threadably mounted in the posts, and which can be raised or lowered simply by rotation in their sockets. These constitute the terminal post connections for the thermocouple wires 30, and for the additional electrical connections from the thermocouple to the measuring or detecting equipment (not shown).

The reciprocating means assembly for the thermocouple sensing elements inserted in the receptacle comprises a hollow tube 40 welded to a flange ring 41 mounted on the inner periphery of the ledge 17 by screws 43. This tube is fitted with a U-shaped conduit or channel 25 which extends the length of the receptacle. The U-shaped conduit 25 is retained in the housing by welding it to slotted washers 44 which are in turn welded to tube 40. The wires 30 of a plurality of thermocouple sensing elements 1 are fitted in the U-portion of the channel 25, as is best seen in FIGURE 4, and each extends to one of a series of junction points 2 within the receptacle 45, so as to provide a number of temperature sensing locations at spaced positions along the length of the receptacle. These wires, as is best seen in FIGURE 2, have metal sheaths 50, and the wires 30 from the sheaths 50 are connected to the terminal blocks 20 and 21 at retainer posts 24.

Fixedly attached to the housing end of the tube 40 via screws 51 is a cap 52, fitted with side openings 54 through which extend the thermocouple wires 30. The outer end of the cap bears a knob 57, which is rotatably held in a central opening 53 of the cap by a retaining wave-shaped spring washer 58, fitted in a circumferential groove 59 at the inner end of the knob. The spring washer 58 holds the knob and consequently the thermocouple assembly against accidental rotation in use, and as will shortly be seen thus prevents accidental withdrawal of the elements from heat-conducting contact with the receptacle wall. The wave form of the retaining ring holds the knob snappingly in one of the two limiting positions of the elements, retraction from, or contact with, the receptacle wall.

A threaded socket 60 in the knob receives a shaft 61 threadably mounted therein, and attached via the spacer 62 to the sheaths 50 of the thermocouple sensing elements 1. Thus, the shaft 61 is operatively connected to the sheaths 50, so that upon rotation of the knob 57, the shaft 61 is drawn up into or thrust down out from the socket 60. In this way, the rotation of the knob 57 is converted into reciprocating movement of the shaft 61, and since this is operatively connected to the sheaths 50 via spacer 62, sheaths 50 and the sensing elements 1 are drawn in or out from the receptacle 45.

Each sensing element 1 at a point adjacent its junction end 2 carries a collar 3 fixedly attached to the metal sheath 50 of the sensing element. This collar is pivotally attached by a pivot 4 to one end of a pair of swinging links 6 and 7. The other end of the swinging links are pivotally mounted via pivots 8 and 9 attached in the side walls 5 of the channel 25. In this manner, movement of a thermocouple sensing element 1 into contact with the receptacle wall is caused by appropriate rotation of knob 57, resulting in moving the shaft 61, into the socket 60, causing the swinging links 6 and 7 to swing on the pivots 8 and 9, respectively, toward the wall 48, and this will thrust the junction end 2 of the thermocouple sensing element 1 into contact with the solid line position shown in FIGURE 3, into contact with the wall 48 of the receptacle. To prevent undue pressure on the wall 48 after pressure contact has been established, and also retain the element ends 2 against the wall during use, in case of vibration or accidental striking of the knob, the spring 58 holds the knob against rotation at this point.

It will also be evident that rotation of the knob 57 in the opposite direction will cause shaft 61 to move out from the socket 60, and thrust the sensing elements in a clockwise direction, causing the links 6, 7 to swing in about the pivots 8, 9, and carrying the junction ends 2 away from the wall 48 of the receptacle 45. The limiting position of retraction is determined by the length of the links 6 and 7, but to prevent strain on the links and pivots, the spring 58 prevents further rotation and thus stops retraction of the junction ends at a point just short of the maximum permissible by the links, holding them there for easy withdrawal of the assembly from the receptacle.

It will thus be seen that the thermocouple assemblies of the invention are readily and simply removed from the receptacle simply by rotating the knob to the limiting position of spring 58, retracting the sensing elements from the receptacle wall, and then by removing the screws 45 and loosening the screws 28 attaching the wires from the terminal blocks, permitting withdrawal of the sensing elements from the receptacle. Installation is correspondingly effected by a reversal of this sequence of steps.

In the thermocouple assembly shown, all parts except the head and mounting block are preferably of stainless steel, to resist corrosion. The head and housing are preferably of aluminum, and the mounting block is preferably of polyoxymethylene resin. However, other metals and plastics can be used.

It will be apparent that the thermocouple assemblies of the invention can be used with drilled thermowells, pipe-type protective tubes, blind receptacles such as bearings and mold blocks, and in fact any type of receptacle employed in this art. Since the sensing element is pressure-held against the receptacle wall, fast and precise temperature measurements are ensured. The terminal head or housing can be in a very compact form with great accessibility to the electrical connections.

Having regard to the foregoing disclosure, the following is claimed as the inventive and patentable embodiments thereof:

1. A swinging link thermocouple assembly capable of being quickly brought into or out of contact with a surface whose temperature is to be measured, comprising, in combination, a temperature sensing element having a temperature sensing portion; support means including mounting means for supporting the temperature sensing element in a fixed position relative to the surface, and guide means fixed in position relative to the mounting means for supporting the temperature sensing portion adjacent the surface; a swinging link for swinging the temperature sensing portion toward and away from the surface, having a first end pivotally mounted to the sensing element, and a second end pivotally mounted to the guide means; and means for moving the sensing element relative to the guide means, such that the temperature sensing portion is swung by the link in an arc described about the pivot on the guide means away from and toward the guide means, thereby swinging the temperature sensing portion into and out of contact with the surface.

2. A swinging link thermocouple assembly in accordance with claim 1 having a plurality of temperature sensing elements each swung on a swinging link pivotally mounted on the guide means.

3. A swinging link thermocouple assembly in accordance with claim 1 wherein the temperature sensing portion of the temperature sensing element is swung between a pair of links pivotally mounted on either side of the element.

4. A swinging link thermocouple assembly in accordance with claim 3 wherein the guide means comprises an open channel having two sides with the temperature sensing element pivotally slung between the sides thereof by the swinging links.

5. A swinging link thermocouple assembly in accordance with claim 1 wherein the means for moving the temperature sensing element comprises a threaded shaft and socket member assembly with one of the shaft and socket members fixed and the other rotatably movable thereon and operatively connected to the sensing element.

6. A swinging link thermocouple assembly in accordance with claim 5 wherein the rotatable member of the shaft and socket assembly is rotatable manually.

7. A swinging link thermocouple assembly, comprising in combination, a housing; a receptacle attached thereto; a temperature sensing element; guide means therefor extending into and in a fixed position in the receptacle; a swinging link, a first end of which is pivotally mounted to a junction end of the sensing element, and a second end of which is pivotally mounted to the guide means; and means for imparting reciprocating movement to the sensing element relative to the guide means and rotatably mounted in the assembly, adapted to impart reciprocating movement to the sensing element upon rotation thereof with respect to the guide means, such reciprocation moving the swinging link and element in an arc described about the pivot on the guide means, for movement of the sensing element into and out of contact with the receptacle wall.

8. A swinging link thermocouple assembly in accordance with claim 7 having a plurality of temperature sensing elements, each swung on a swinging link pivotally mounted on the guide means.

9. A swinging link thermocouple assembly in accordance with claim 7 wherein each sensing element is swung between a pair of links pivotally mounted on either side of the element.

10. A swinging link thermocouple assembly in accordance with claim 7 wherein the guide means comprises an open channel having two sides, with the sensing element pivotally slung between the sides thereof by the swinging links.

11. A swinging link thermocouple assembly in accordance with claim 7 wherein the means for imparting reciprocating movement to the sensing element comprises a threaded shaft and socket member assembly, with one of the shaft and socket members fixed, and with the other rotatably movable thereon, and operatively connected to the sensing element.

References Cited

UNITED STATES PATENTS 1,648,939   11/1927   Evins _____ 136—230 X

WINSTON A. DOUGLAS, Primary Examiner

M. J. ANDREWS, Assistant Examiner